A. KOLEHMAINEN.
MOWER.
APPLICATION FILED APR. 5, 1909.
936,137.
Patented Oct. 5, 1909.
2 SHEETS—SHEET 2.
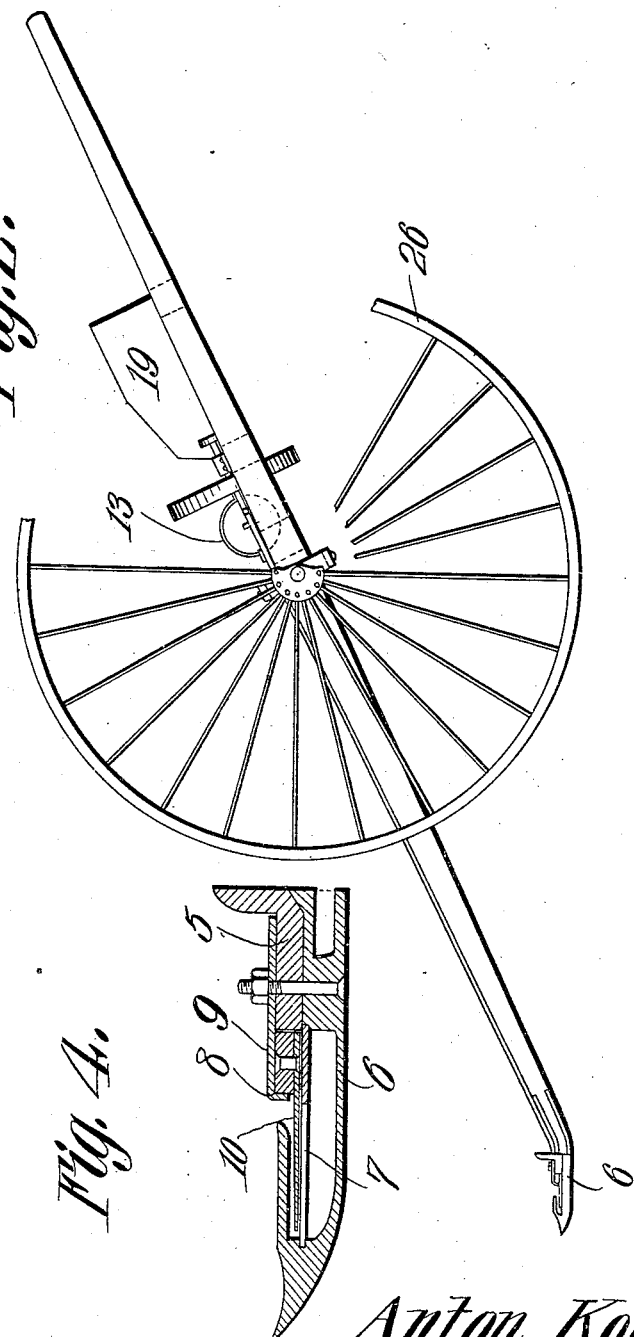
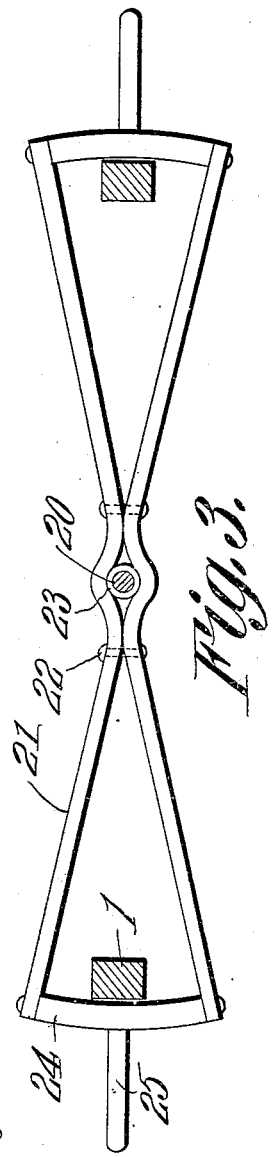
Witnesses
Inventor
Anton Kolehmainen,
By C.A. Snow & Co.
Attorneys

UNITED STATES PATENT OFFICE.

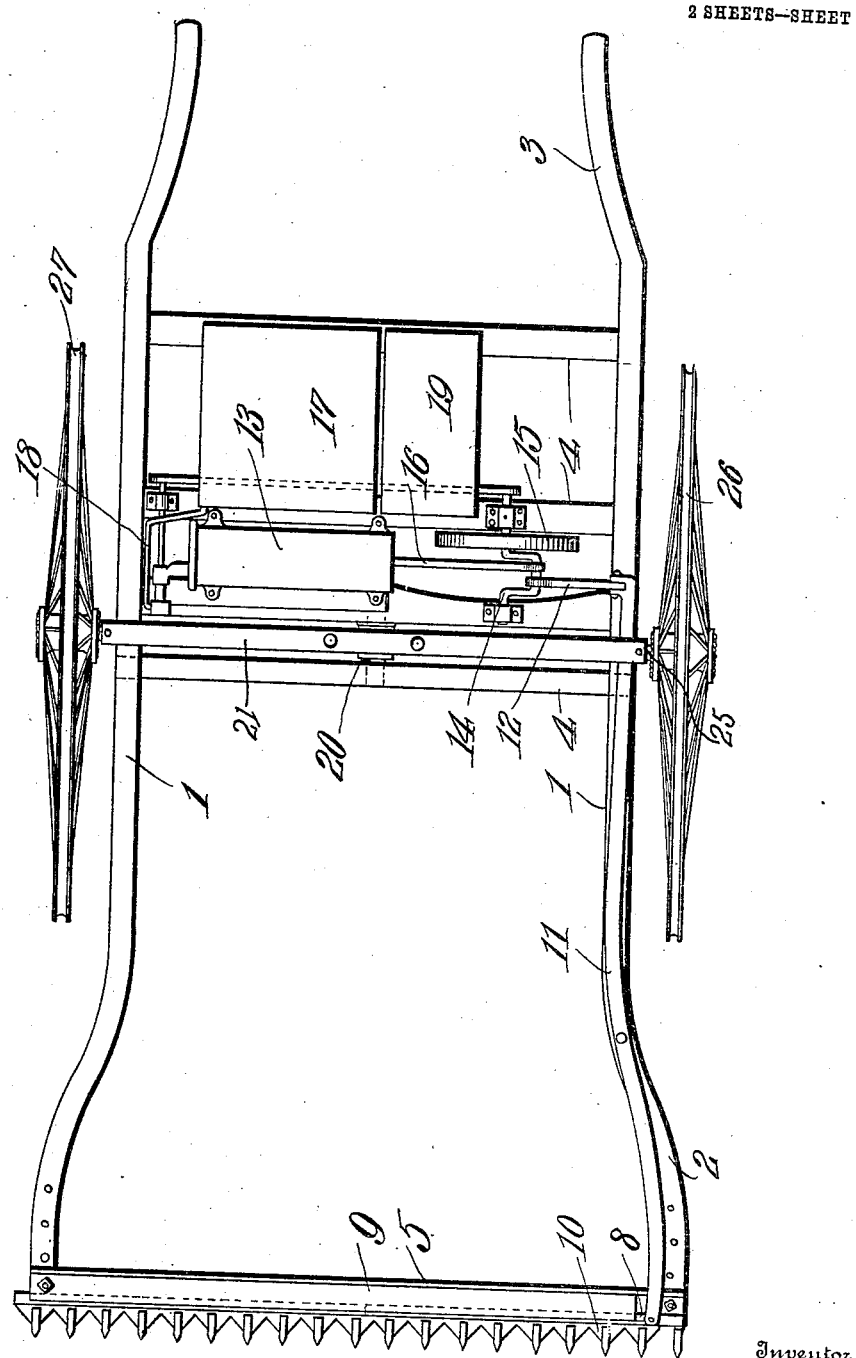

ANTON KOLEHMAINEN, OF VICTORIA, MICHIGAN.

MOWER.

936,137.  Specification of Letters Patent.  Patented Oct. 5, 1909.

Application filed April 5, 1909. Serial No. 488,012.

*To all whom it may concern:*

Be it known that I, ANTON KOLEHMAINEN, a citizen of the United States, residing at Victoria, in the county of Ontonagon and State of Michigan, have invented a new and useful Mower, of which the following is a specification.

This invention has relation to mowers and it consists in the novel construction and arrangement of its parts, as hereinafter shown and described.

The object of the invention is to provide a mower adapted to be manually propelled, and which is provided with a power-actuated sickle-bar.

With this object in view, the mower includes a frame upon which is mounted an engine. A cutter-bar forms a portion of the frame of the mower and carries guard fingers of usual pattern, and a sickle-bar is mounted for reciprocation with relation to the cutter-bar. The sickle-bar is operatively connected with the engine. A wheel-mounted axle of peculiar construction and configuration is provided for supporting the frame, and the frame is so mounted upon the axle, that it (the frame) may be tilted laterally with relation to the axle.

In the accompanying drawings:—Figure 1 is a top plan view of the mower. Fig. 2 is a side elevation of the same, with parts broken away. Fig. 3 is a transverse sectional view through the mower frame at the axle. Fig. 4 is a transverse sectional view, enlarged, of the cutter-bar and attached parts.

The mower frame includes side bars 1, 1, which, at their forward portions, are bowed away from each other as at 2, and at their rear portions are fashioned into handles 3. Along their intermediate portions the said side bars 1 1 are parallel, and the parallel portions of the said bars are connected together by cross bars 4, any suitable number of which may be employed. At their forward ends the side bars 1 are connected together by a cutter-bar 5. Guard fingers 6 are arranged along the cutter-bar 5 in the usual manner, and are provided with ledger plates 7. A sickle-bar 8 is mounted for reciprocation against the forward edge of the cutter-bar 5, and is held in position against the said edge of the said bar by a guard plate 9, which is fixed to the cutter-bar 5.

Knives 10 are carried by the sickle-bar 8. A lever 11 is fulcrumed to one of the side bars 1, and at its forward end is pivotally connected with one end of the sickle-bar 8. At its rear end the said lever 11 is pivotally connected with the outer end of a link 12. An engine 13 is mounted upon the frame of which the bars 1 and 4 form the component parts, and a crank shaft 14 is journaled upon the said frame. The said crank shaft is provided with a fly-wheel 15, and to the crank of the shaft is connected one end of the piston rod 16, the other end of which is connected with a piston (not shown), forming a part of the engine 13. The inner end of the link 12 is pivotally connected with the crank of the shaft 14. An oil tank 17 is mounted upon the frame of the mower and is connected with the engine 13 by a pipe 18 in the usual manner. A tool-box 19 is mounted upon the frame of the mower. A shaft 20 is held in fixed position at the median line of the frame of the mower.

An axle for supporting the frame and the parts mounted thereon, as above described, is provided, and the said axle consists of upper and lower bars 21, which are drawn together at their intermediate portions and held by bolts 22. A sleeve 23 is held between the bolts 22 and the inner sides of the bars 21, and is journaled upon the shaft 20 above mentioned. The outer end portions of the axle-bars 21 are held apart by blocks 24, which are located beyond the outer sides of the side-bars 1 of the frame of the mower, and which are provided, at points intermediate of their ends with outwardly disposed pins 25. Ground wheels 26 are journaled for rotation upon the said pins 25. The vertical thickness of the side bars 1 of the frame of the mower is not so great as the length of the blocks 24, or the space between the inner sides of the outer portions of the axle-bars 21. The rims of the wheels 26 are preferably grooved as illustrated at 27 in Fig. 1 of the drawings.

In operation, as the implement is propelled over the surface of the ground by an operator having hold of the handles 3, the frame of which the bars 1 and 4 form the component parts, may be tilted laterally with relation to the axle upon the shaft 23, as an axis, and thus the cutter-bar 5 and its attachments may be directed substantially horizontal with the surface of the ground, irrespective of irregularities in the said surface. At the same time the engine 13 may be started in operation, and through the operation of the said engine and the piston rod 16, the crank shaft 14 is rotated, which movement is conveyed through the link 12 to the lever 11, which is rocked upon its fulcrum. In response to the rocking movement of the lever 11 the sickle-bar 8 is reciprocated longitudinally against the forward edge of the cutter-bar 5, and the knives 10 are moved back and forth over the edges of the ledger plates 7, carried by the guard fingers 6. Thus, as the said knives 10 come in contact with standing vegetation, the said vegetation is mowed without tearing or dragging those portions of the stalks left standing in the soil. The foliage or vegetable matter which is severed from the stalks falls back over the guard plate 9 and the cutter-bar 5 through the space between the bowed portions 2 of the side bars 1 of the frame of the mower. It will also be seen that the operator may tilt the frame of the mower of which the bars 1 and 4 form the component parts, longitudinally upon the pins 25 as axes. Furthermore, it will be seen that inasmuch as the engine 13, tank 17 and tool-box 19, are located at that side of the frame of the mower opposite the side thereof which carries the cutter-bar 5 and the cutting mechanism, the parts supported by the frame and the frame itself is counterbalanced, or approximately so, upon the supporting wheels 26.

What is claimed is:—

1. A mower comprising a frame, a wheel-supported axle connected with the frame at a point intermediate of its ends, said frame being free for lateral tilting movement with relation to the supporting wheels upon an axis midway between the supporting wheels, and for longitudinal tilting movement with relation to the axle, cutting mechanism carried by the frame, actuating means carried by the frame, and means operatively connecting the actuating means with the cutting mechanism.

2. A mower comprising a frame, cutting mechanism mounted upon the frame, actuating means mounted upon the frame, means operatively connecting the actuating means with the cutting mechanism, an axle comprising bars spaced apart at their end portions, said frame being pivotally mounted upon the intermediate portion of the said axle, the side portions of the frame passing between the spaces provided at the end portions of the axle, and supporting wheels journaled for rotation at the ends of the axle.

In testimony that I claim the foregoing as my own, I have hereto affixed my signature in the presence of two witnesses.

ANTON KOLEHMAINEN.

Witnesses:
   HAROLD FRIMODIG,
   CHARLES T. SMITH.